(12) United States Patent
Elsner et al.

(10) Patent No.: US 10,934,095 B2
(45) Date of Patent: Mar. 2, 2021

(54) MODULAR BELT AND TRACTION ELEMENT FOR A MODULAR BELT

(71) Applicant: Habasit AG, Reinach (CH)

(72) Inventors: Dietmar Elsner, Lörrach (DE); Stefan Simmendinger, Arlesheim (CH); Markus Vetter, Schliengen (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 15/890,342

(22) Filed: Feb. 6, 2018

(65) Prior Publication Data

US 2019/0241367 A1    Aug. 8, 2019

(51) Int. Cl.
| | |
|---|---|
| *B65G 17/42* | (2006.01) |
| *B65G 17/06* | (2006.01) |
| *B65G 23/06* | (2006.01) |
| *B65G 17/38* | (2006.01) |
| *B65G 17/44* | (2006.01) |
| *B29D 29/06* | (2006.01) |

(52) U.S. Cl.
CPC ........... *B65G 17/42* (2013.01); *B65G 17/067* (2013.01); *B65G 17/38* (2013.01); *B65G 17/44* (2013.01); *B65G 23/06* (2013.01); *B29D 29/06* (2013.01); *B65G 2812/02287* (2013.01); *B65G 2812/02376* (2013.01); *B65G 2812/02495* (2013.01)

(58) Field of Classification Search
CPC ...... B65G 17/42; B65G 17/067; B65G 23/06; B65G 2812/02287; B65G 2812/02376; B65G 2812/02495; B65G 17/002; B65G 17/02; B65G 23/14; B29D 29/06; B56G 23/16
USPC .................................................. 198/850–853
See application file for complete search history.

(56) References Cited

U.S. PATENT DOCUMENTS

| | | | |
|---|---|---|---|
| 2,954,113 A * | 9/1960 | Hibbard | ............... B65G 17/065 198/845 |
| 3,245,518 A | 4/1966 | Reibel | |
| 3,311,222 A | 3/1967 | Crawford | |

(Continued)

FOREIGN PATENT DOCUMENTS

| | | |
|---|---|---|
| DE | 102007016585 A1 | 1/2008 |
| EP | 2116487 A1 | 11/2009 |

(Continued)

OTHER PUBLICATIONS

Conveyor Belt Group, Installing and Splicing Textile Conveyor Belts, Edition, Oct. 5, 2017.

*Primary Examiner* — Mark A Deuble
(74) *Attorney, Agent, or Firm* — Hodgson Russ LLP (57) ABSTRACT

The present disclosure provides a modular belt having two or more longitudinal belt sections. Each belt section includes a traction element having a cord and a plurality of drive elements attached to the cord. The drive elements are spaced apart along a length of the cord. The belt section further includes a plurality of belt plates. Each belt plate is removably attached to a corresponding drive element of the traction element. The belt section may comprise at least one additional traction element to which each belt plate is attached. In this way, each belt plate may be attached to two or more traction elements. The modular belt includes two or more connectors, wherein each connector is configured to longitudinally couple two belt sections in order to form the modular belt as an endless belt.

21 Claims, 9 Drawing Sheets

(56) References Cited

U.S. PATENT DOCUMENTS

| | | | | |
|---|---|---|---|---|
| 3,910,404 A | * | 10/1975 | Henrekson | B65G 17/385 |
| | | | | 198/712 |
| 3,967,721 A | * | 7/1976 | Rhoden | B65G 17/12 |
| | | | | 198/835 |
| 4,078,654 A | * | 3/1978 | Sarovich | B65G 17/42 |
| | | | | 198/804 |
| 4,678,078 A | * | 7/1987 | Hastem-Muller | B65G 15/52 |
| | | | | 198/690.2 |
| 7,278,531 B2 | * | 10/2007 | Hartness | B65G 17/385 |
| | | | | 198/470.1 |
| 2008/0073184 A1 | | 3/2008 | Yoshida | |
| 2008/0164124 A1 | * | 7/2008 | Reist | B65G 17/086 |
| | | | | 198/779 |
| 2017/0197790 A1 | * | 7/2017 | Zelenovskiy | B65G 17/065 |
| 2018/0002110 A1 | * | 1/2018 | Adomaitis | B65G 17/067 |

FOREIGN PATENT DOCUMENTS

| | | |
|---|---|---|
| JP | S6317712 A | 1/1988 |
| JP | 2017086385 A | 5/2017 |

* cited by examiner

MODULAR BELT AND TRACTION ELEMENT FOR A MODULAR BELT

FIELD OF THE DISCLOSURE

The present disclosure relates to modular belts, and in particular, modular conveyor belts.

BACKGROUND OF THE DISCLOSURE

Traditional modular belts are made with belt modules having hinge-like connections to adjacent belt modules with pivot rods linking the hinges. Such belts are often noisy, may vibrate, and may have components which wear due to such vibrations and movement. Replacement of a broken or worn module often requires "breaking" the belt (i.e., the continuity of the belt), so that the module may be removed from a location in the length of an endless belt. This can be difficult due to the tensions carried through the belt, and may require specialized tools to disconnect and reconnect the endless belt. There is a long-felt need for a belt which can minimize these disadvantages.

BRIEF SUMMARY OF THE DISCLOSURE

A modular belt is disclosed, the belt having two or more longitudinal belt sections. Each belt section includes a traction element having a cord and a plurality of drive elements attached to the cord. The drive elements are spaced apart along a length of the cord. Each traction element may further include at least one additional cord to which each drive element is attached. The cord may be configured as a rope, a cable, or otherwise. The cord may be made from plastic, metal, a composite material, or other materials or combinations of materials. The drive elements may be made from plastic, metal, a composite material, or other materials or combinations of materials. In some embodiments, each drive element is overmolded onto the corresponding cord(s). The cord(s) of a traction element may be any diameter, for example, the diameter may be between 1 mm and 10 mm (but may have smaller or larger diameter).

The belt section further includes a plurality of belt plates. Each belt plate is removably attached to a corresponding drive element of the traction element. The belt section may comprise at least one additional traction element to which each belt plate is attached. In this way, each belt plate may be attached to two or more traction elements.

In some embodiments, each belt plate includes a channel from a first end of the belt plate to a second end of the belt plate. The drive elements may be configured to attach to the channels of the belt plates. For example, each drive element or a portion of each drive element may be configured to be disposed within a corresponding channel of a belt plate. The drive elements may be configured to be attached to the belt plates by a snap or clip connection.

In some embodiments, the drive elements may further include a protrusion configured to engage with recesses of the belt plates. In some embodiments, the recesses are through holes to a top surface of the belt plates. The protrusions of the drive elements may be disposed in the through holes such that each protrusion extends to the top surface of the corresponding belt plate. In some embodiments, the drive elements or a portion thereof is electrically conductive. In this way, the drive elements may serve to prevent or reduce a buildup of static electricity on the top surface of the belt plates.

The modular belt includes two or more connectors. Each connector is configured to longitudinally couple two belt sections in order to form the modular belt as an endless belt. In some embodiments, the connectors are traction elements. In some embodiments, the connectors are rods configured to connect an end drive element of a belt section to an end drive element of an adjacent belt section.

In some embodiments, each belt section further comprises an end belt plate having a plurality of link ends extending in a direction of belt travel and configured to interdigitate with link ends of an end belt plate of an adjacent belt section. A transverse opening is disposed through the plurality of link ends to accept a pivot rod. In such embodiments, the pivot rod may be considered as the connector or the pivot rod and end belt plates may be considered as the connector.

In some embodiments, each drive element is configured to engage with a tooth of a sprocket. The sprocket may be, for example, a drive sprocket or an idler sprocket. In this way, the belt may be moved by force applied by the drive sprocket teeth to the drive elements.

In another aspect, a traction element is provided for a modular belt. The traction element includes a cord and a plurality of drive elements attached to the cord and spaced apart along a length of the cord. The traction element and the components thereof may be of any of the embodiments described herein with respect to the modular belt.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1A:
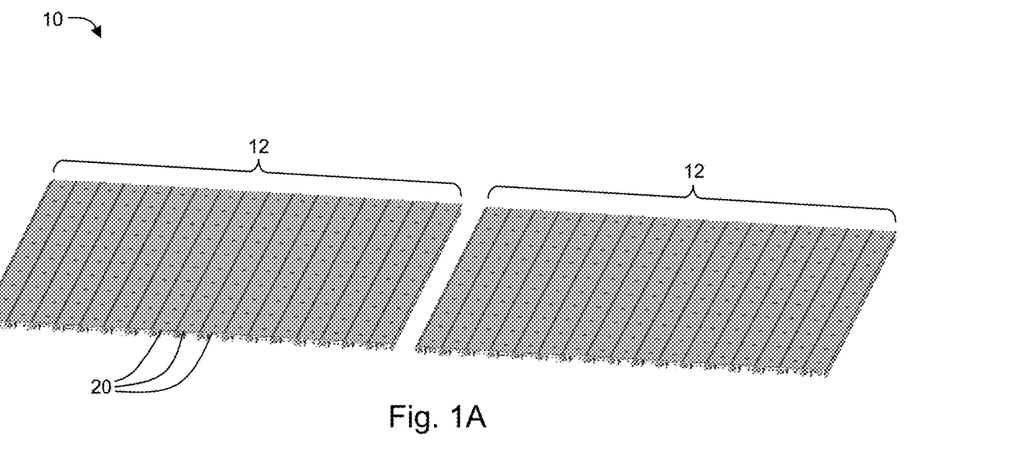
FIG. 1A is a top perspective view of a portion of a modular belt comprising two belt sections according to the present disclosure.
Figure 1B:
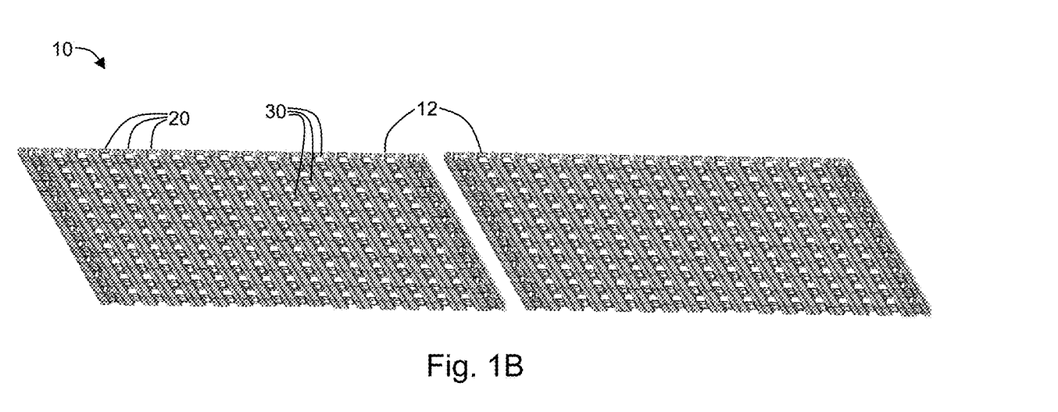
FIG. 1B is a bottom perspective view of the modular belt portion of FIG. 1A.
Figures 2A, 2B, 3A:
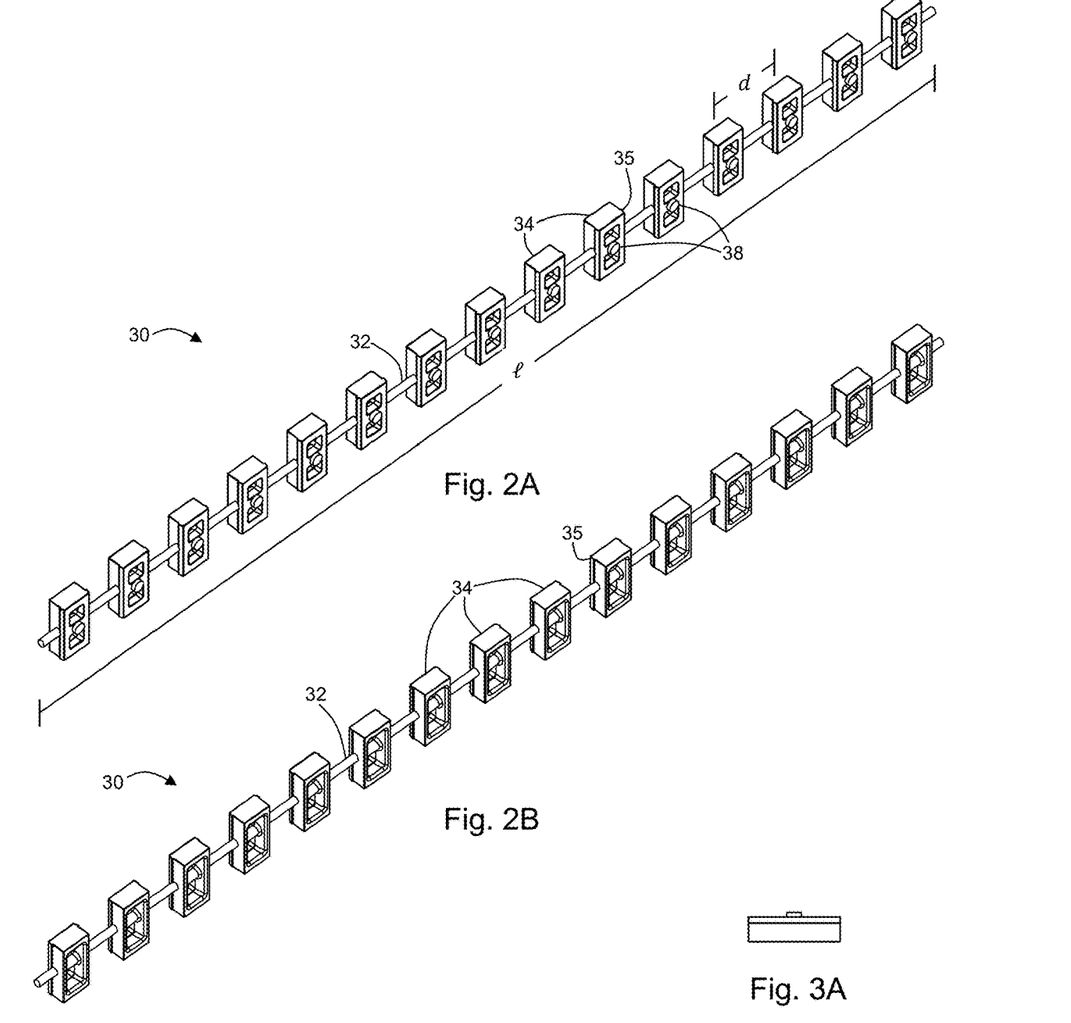
FIG. 2A is a perspective view of a traction element according to an embodiment of the present disclosure.
FIG. 2B is a perspective view of the reverse side of the traction element of FIG. 2A.
FIG. 3A is an end view of a traction element according to another embodiment.
Figure 3B:
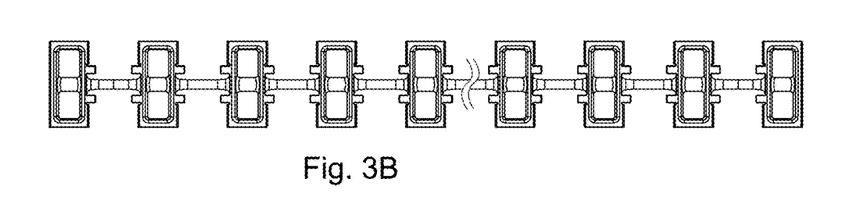
FIG. 3B is a bottom view of the traction element of FIG. 3A.
Figure 3C:
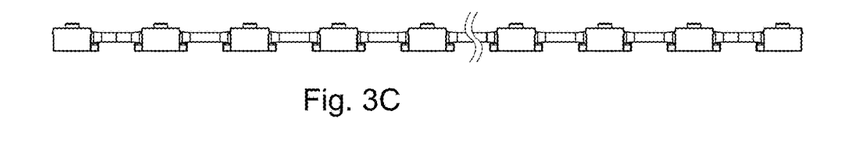
FIG. 3C is a front view of the traction element of FIGS. 3A and 3B.
Figure 4A:
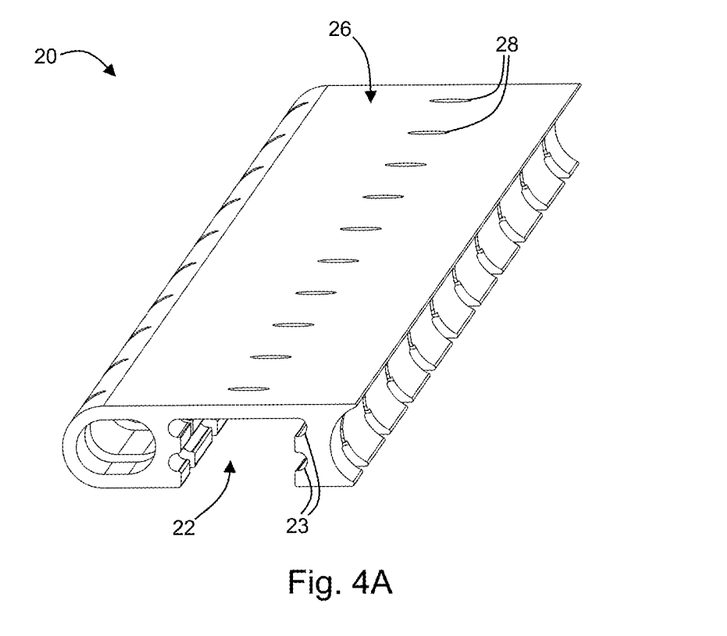
FIG. 4A is a perspective view of a belt plate according to an embodiment of the present disclosure.
Figure 4B:
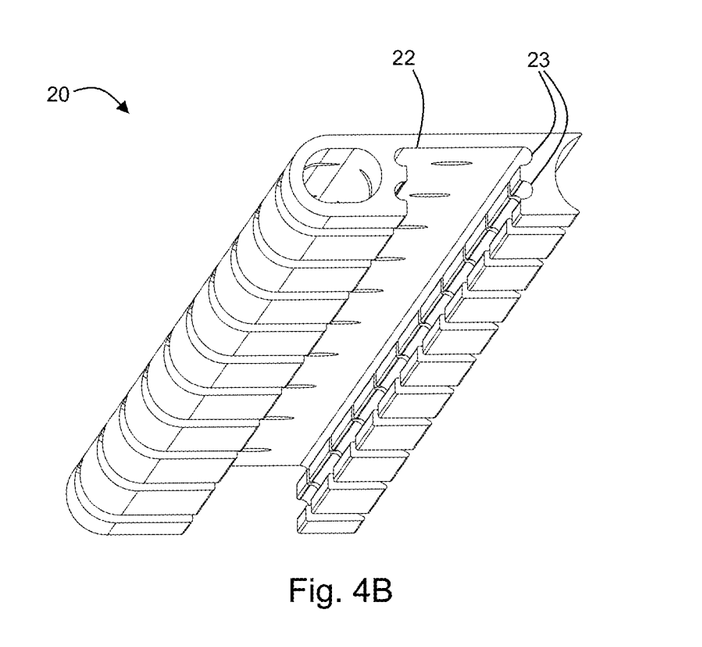
FIG. 4B is another perspective view of the belt plate of FIG. 4A.

The present disclosure may be embodied as a modular belt 10 wherein rows of belt plates 20 are interconnected by one or more traction elements 30 (see, e.g., FIGS. 1A and 1B). A belt 10 is made up of two or more longitudinal belt sections 12. A longitudinal belt section 12 is a portion of a conveyor belt having a traction element 30 and a plurality of belt plates 20 attached together by way of the traction element 30. The traction element 30 is made up of a cord 32 and a plurality of drive elements 34 attached to the cord 32 (see, e.g., FIGS. 2A, 2B, and 3A-3C). The drive elements 34 are spaced apart along a length of the cord 32—i.e., the drive elements 34 are separated by a distance d (measured from center to center). The spacing of the drive elements 34 will dictate a spacing of the belt plates 20, thereby defining a pitch of the belt 10. For example, where each belt plate 20 is attached to one drive element 34 of a traction element 30, the belt pitch will be the same as the distance d separating the drive elements 34. In some embodiments, a belt plate 20 could be attached to more than one drive element 34 of a traction element 30. In some embodiments, the modular belt is a radius belt (i.e., able to traverse curved paths). In such embodiments, the width of the belt plate 20 may be less than the spacing of the drive elements such that the belt modules may move closer together as needed for curved sections (where the belt is said to collapse on the insider of a curved path). In such embodiments, the cord 32 may be flexible to aid in following a curved path.

Each belt plate 20 may be removably attached to a corresponding drive element 34. In this way, a belt plate 20 needing replacement, can be removed from a belt 10 without the need to disassemble the belt 10—for example, without the need to break the continuity of an endless belt. The belt plate 20 may comprise a channel 22 into which the corresponding drive element(s) 24 may be inserted (see, e.g., FIGS. 4A, 4B, 10A, and 10B). The channel 22 may extend along a length of the belt plate 20—i.e., in a transverse direction relative to the belt 10. The channel 22 may have one or more grooves 23 configured to receive a tab 35 of a drive element 34. In some embodiments, the tab 35 of the drive element 34 can be tapered so that the drive element can be more easily pressed into the channel, but is rendered more difficult to remove from the channel (or not possible to remove from the channel without damaging the drive element).

In some embodiments, a drive element 34 may be configured so as to be disposed into a belt plate 20 by sliding the drive element 34 into the channel 22 from an end 23 of the channel 22. The drive element 34 may include a protrusion 38 configured to be disposed in a recess 24 of the channel 22. In this way, the protrusion 38 will engage with the recess 24 so as to maintain a position of the drive element 34 within the channel 22. Any embodiment of the presently-disclosed components may include a protrusion of a drive element and a recess of a belt plate, and the scope of such a configuration is not limited to those embodiments where a belt plate includes a channel. In some embodiments, the recess 24 is a through hole which extends to through the belt plate 20 to a top surface 26 of the belt plate. The protrusion 38 of the drive element 34 may be configured to extend through the through hole to the top surface 26 of the belt plate 20. In some embodiments, the drive element 34 or a portion of the drive element may be electrically conductive such that the protrusion 38 extending to the top surface 26 may dissipate static electricity from the top surface (or prevent such a buildup from occurring).

Figure 11:
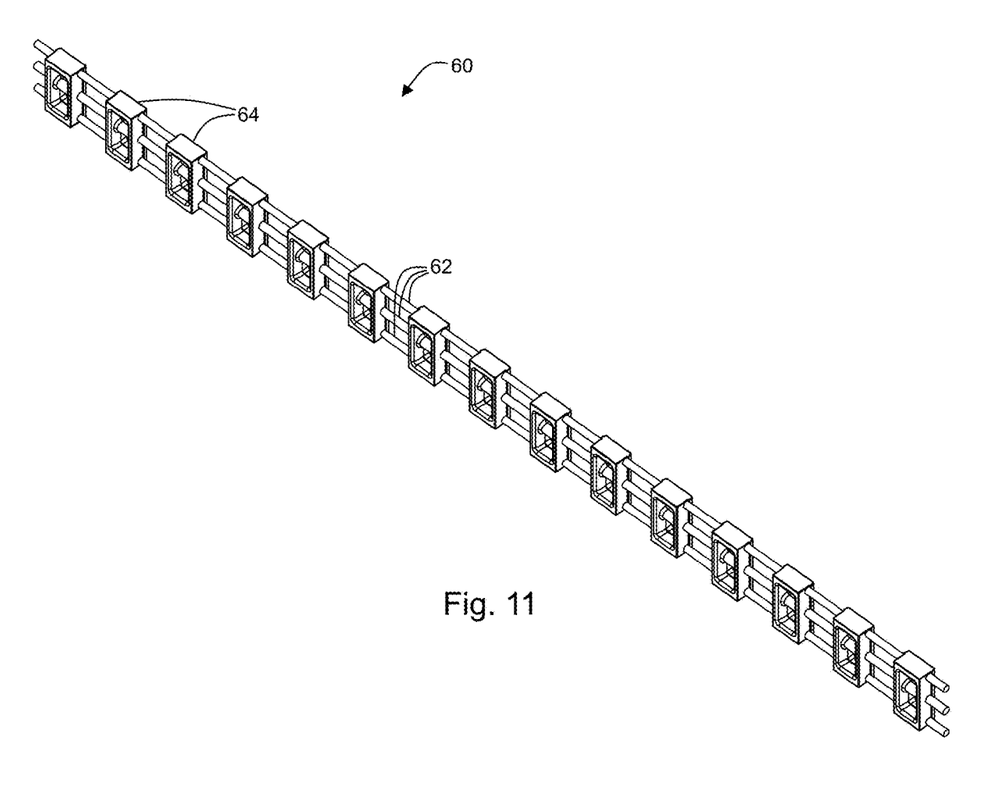
FIG. 11 is a perspective view of a traction element according to another embodiment of the present disclosure.

The cord 32 of the traction element 30 may be made of any suitable material, such as, for example, a plastic, a metal, a composite material, or any combination of these or other materials. In some embodiments, the cord 32 has a monolithic construction—the cord is made from a single piece of material. In other embodiments, the cord has a multifilament construction, such as, for example, a rope, a cable, a braid, or other twisted or interlaced configurations or combinations of these. Such twisted or interlaced configurations may use, for example, wire (such as, for example, steel, aluminum, etc.) or natural and/or man-made yarns or fibers (such as, for example, nylon, carbon fibers, etc.) Some embodiments of a traction element include more than one cord. For example, FIG. 11 depicts a traction element 60 having three cords 62, wherein each drive element 64 is attached to all three cords 62. The use of multiple cords and/or multiple traction elements may provide additional belt strength. For example, a low-strength design may have a distance between traction elements of 250 mm or more (in the transverse direction—i.e., across the width of the belt). Higher strength belts may utilize a shorter distance between traction elements, such as, for example, 50 mm. These distances are intended to be illustrative, and belts may be designed with other distances between elements greater than 250 mm, less than 50 mm, or other values between 50 and 250 mm (including non-uniform spacing, where the transverse distance between any two traction elements may not be the same).

The cord(s) 62 may be of any diameter suitable to the design requirements. For example, in some embodiments, the cord has a diameter of between 1 mm and 10 mm, though the cord can be less than 1 mm or greater than 10 mm. In some embodiments, the cord made from a material having a stiffness such that vibration and/or noise the belt is reduced. In some embodiments, the longitudinal stiffness may be defined by the longitudinal stiffness of the cord. For example, in an embodiment wherein the cord is a polyester rope, the longitudinal stiffness may be greater than 1000 daN/mm$^2$ (note that this is an illustrative example and is not intended to be limiting). In some embodiments, the longitudinal stiffness may be greater than the longitudinal stiffness of a hinged modular belt.

In some embodiments, it may be advantageous or desirable to protect the cord against environmental factors such as, for example, ultraviolet light and humidity. In such embodiments, the cord, or portions of the cord, may be covered by a sheath. For example, in some embodiments, such as the traction element 330 depicted in FIG. 12A, the cord 332 may be overmolded with a sheath 333 between the drive elements 334. Such a sheath may be made from any suitable material, for example, the material may be selected according to the environmental factors against which the sheath will protect the cord.

Figure 12A:
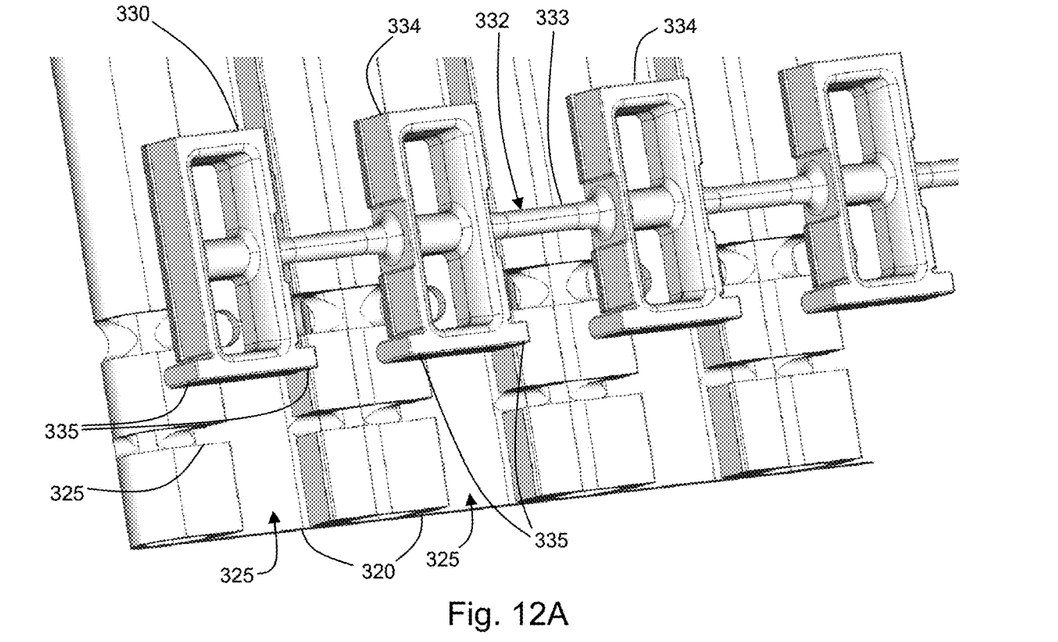
FIG. 12A is a perspective view of another embodiment of the present disclosure wherein the drive element is not inserted into the belt plates.
Figure 12B:
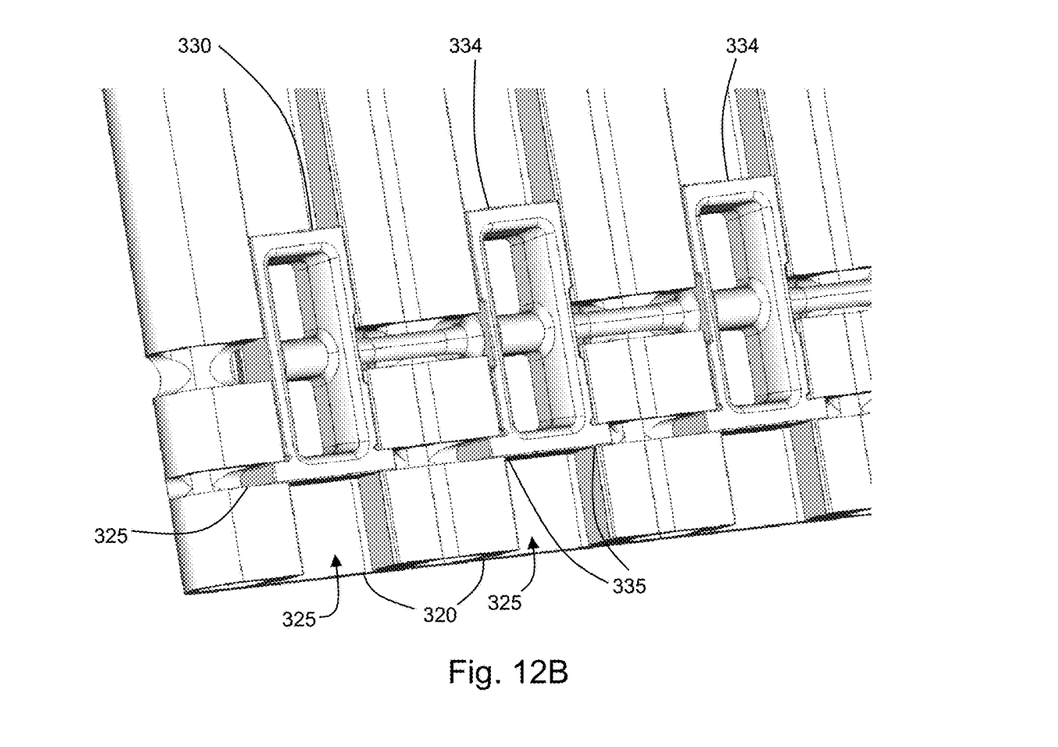
FIG. 12B is a perspective view of the assembled components of FIG. 12A.

In some embodiments, such as the embodiment depicted in FIGS. 12A and 12B, a drive element 334 may include one or more stabilizing tab(s) 335. The stabilizing tabs 335 correspond with one or more slot(s) 325 of the belt plate 320 in order to provide additional lateral stability to the drive elements 334 disposed in the channels 322 of the belt plates 320.

Embodiments of the present disclosure may be advantageous in providing reduced noise. Existing modular belts—having modules interconnected using hinge-like joints having a pivot rod—are often fairly loud. The noise may be due to clearance between adjacent modules and between the modules and the pivot rods. Such clearance results in noises made when the modules and/or pivot rods come into contact (for example, when the belt is moved around a sprocket, when traversing a curved path, etc.) In embodiments of the present disclosure, no pivot rods (or a reduced number of pivot rods) are needed. Additionally, the belt plates may be designed so that they do not contact one another and the cord may provide sufficient stiffness to prevent contact between belt plates. Also, in some configurations, a cord bending around a sprocket will result in much less noise than a traditional modular belt design. Such clearance between modules/rods in traditional designs also results in friction losses, and belts of the present disclosure may consume less energy (increased efficiency). The elimination of movement between modules and pivot rods eliminates "hinge wear" seen in traditional belts. This result in an increase in belt life (a traditional belt is often replaced when the belt is elongated by 3% or more due to hinge wear). The lack of hinge wear also reduces the amount of dust created during the lifetime of a belt.

The drive elements 34 can be attached to the cord 32 in a variety of ways. In some embodiments, the drive elements 34 are overmolded onto, or otherwise directly formed on, the cord 32. In some embodiments, the drive elements 34 are mechanically affixed to the cord 32. For example, a mechanical fastener and/or adhesive may be used to affix the drive elements 32. In another example, the drive elements may be braided or otherwise integrated into the structure of a cord having a twisted or interlaced configuration material. In other embodiments, the drive elements may be welded, brazed, or soldered to the cord. Other suitable techniques for joining drive elements to cords will be apparent in light of the present disclosure and are within the scope of the disclosure. The drive elements may be attached using any technique or combination of more than one techniques.

Figure 5A:
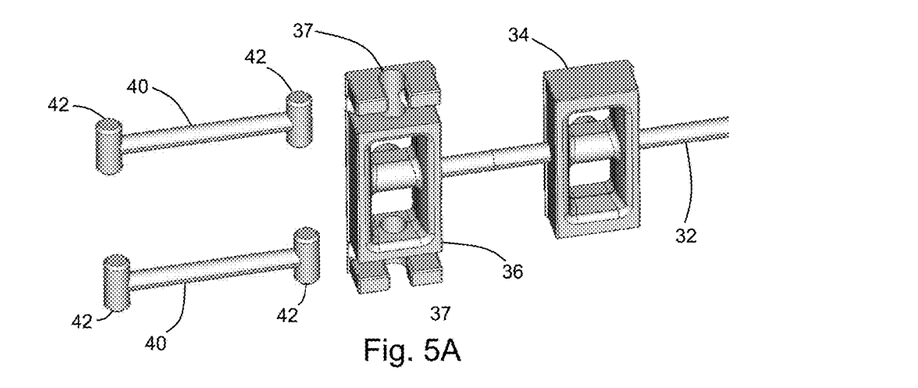
FIG. 5A is a perspective view of a portion of a traction element, including an end drive element, and a pair of rod connectors.
Figure 5B:
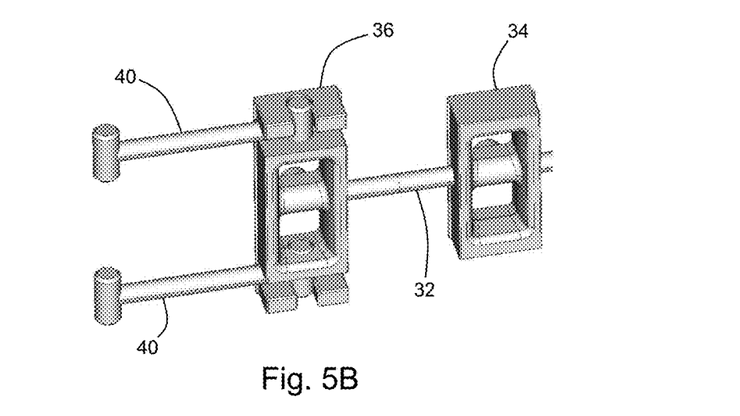
FIG. 5B is a perspective view of the rods of FIG. 5A connected to the end drive element.
Figure 6:
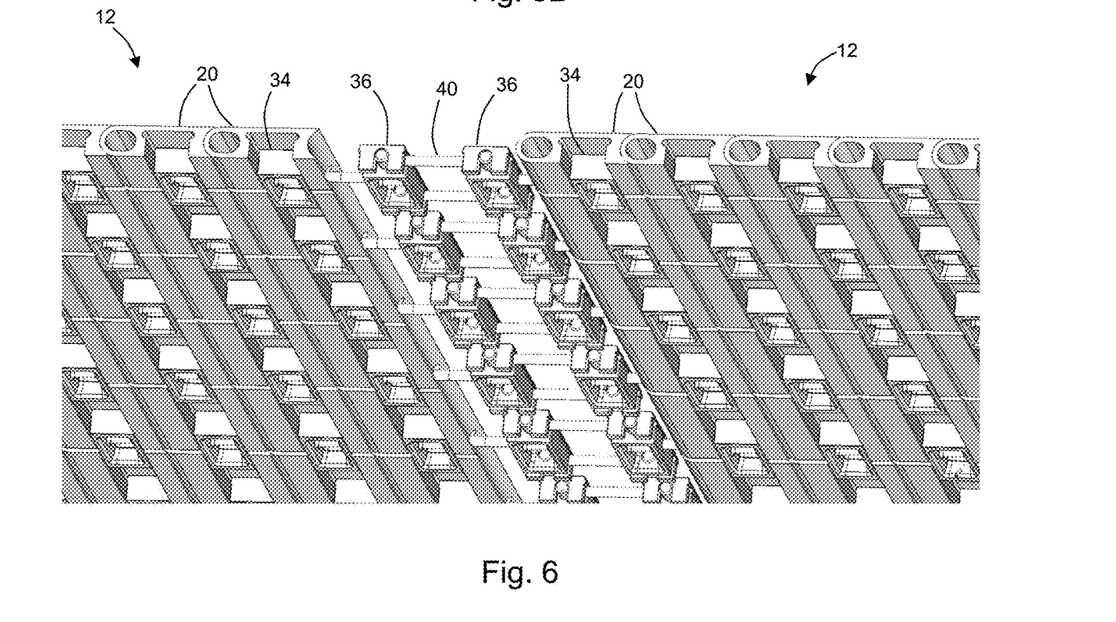
FIG. 6 is a view of a portion of a modular belt of another embodiment of the present disclosure, where two belt plates have been removed to better show the connection of two belt sections by connectors.

The modular belt 10 further includes two or more connectors 40, wherein each connection 40 couples a belt section 12 to another belt section 12 (i.e., coupling two belt sections 12 together). In some embodiments, such as the embodiment depicted in FIGS. 5A and 5B) more than one connector 40 can be used to couple two belt section 12 to one another. In the exemplary embodiment depicted in FIGS. 5A and 5B, each connector 40 is configured to be connected to end drive elements 36 of two adjacent belt sections 12 so as to couple the belt sections 12. In such an embodiment, the connector 40 may be a rod. The rod may have a protrusion 42 at each end of the rod, wherein the protrusion 42 is configured to be disposed in a recess 37 of an end drive element 36. In this way, when each protrusion 42 is disposed in a corresponding recess 37, the connector 40 will couple the belt sections 12. In some embodiments, more than one rod may be used to connect an end drive element 36 to an end drive element 36 of an adjacent belt section 12.

Figure 9:
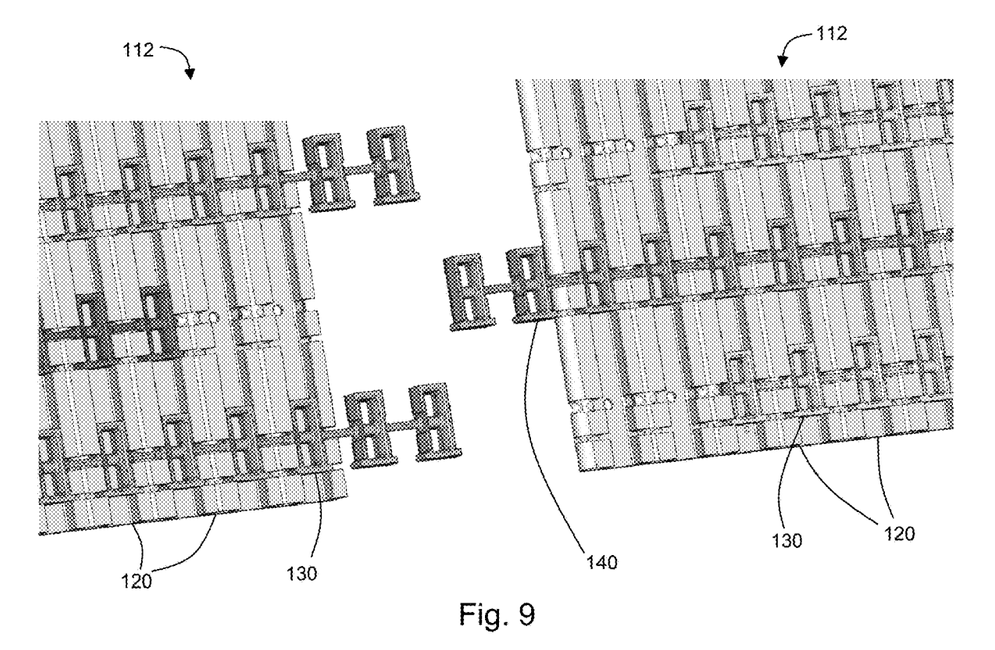
FIG. 9 is a view of portions of two belt sections having another embodiment of a connector, wherein the connector is a traction element.
Figure 10A:
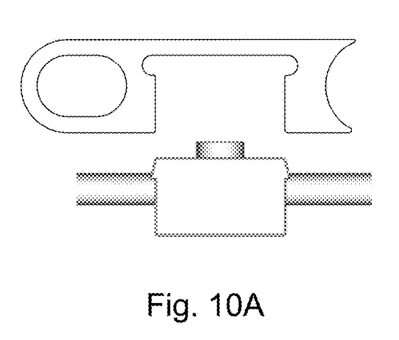
FIG. 10A shows an elevation view of a belt plate and a portion of a traction element separated from each other.
Figure 10B:
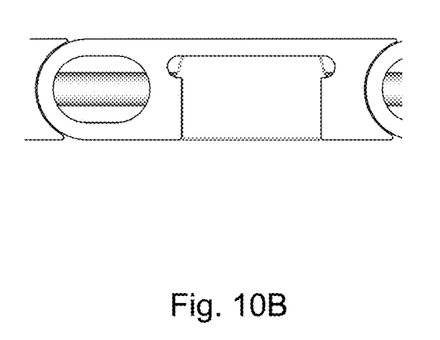
FIG. 10B shows an elevation view of the assembled belt plate and traction element portion.

In some embodiments, such as that depicted in FIG. 9, each connector 140 is a traction element. In this way, a belt section 112 is made up of belt plates 120 interconnected by a traction element 130, and each belt section 112 is connected to an adjacent belt section 112 by a traction element 140. In some embodiments, the traction elements 130 of a belt section 112 and the traction elements of a connector 140 may overlap (i.e., such that a number of adjacent belt plates may be connected to more than one traction element).

Figure 8:
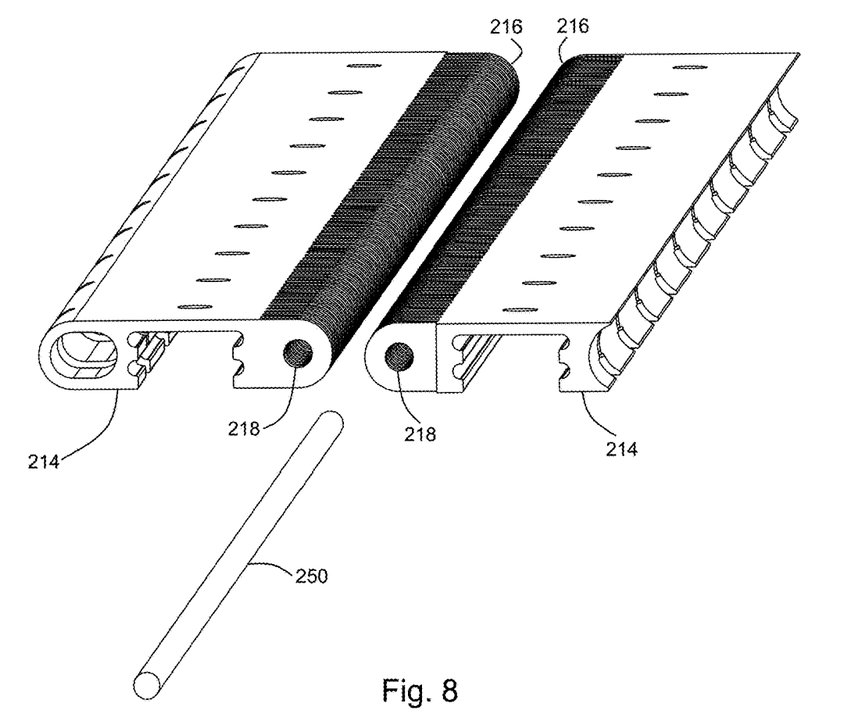
FIG. 8 is an exploded view of a connector according to another embodiment of the present disclosure, wherein two end belt plates are shown with a pivot rod.

In some embodiments, each belt section 212 further comprises an end belt plate 214 having a plurality of link ends 216 extending in a direction of belt travel and configured to interdigitate with link ends 216 of an end belt plate 214 of an adjacent belt section 212. A transverse opening 218 is disposed through the plurality of link ends 216 to accept a pivot rod 250. In such embodiments, the pivot rod 250 may be considered as the connector or the pivot rod and end belt plates may collectively be considered as the connector.

Figure 7A:
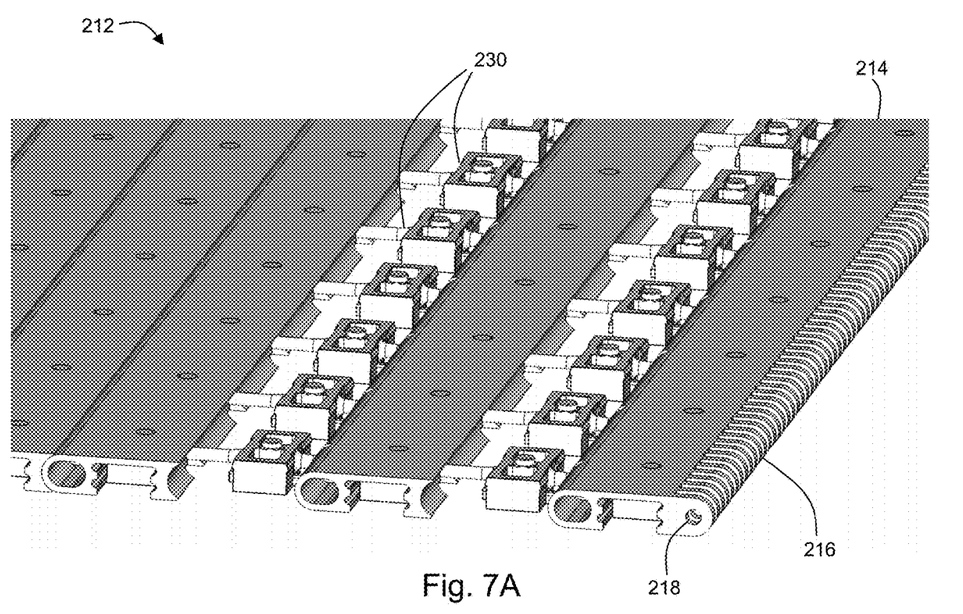
FIG. 7A is a perspective view of a portion of a belt section according to another embodiment of the present disclosure, wherein two belt plates have been removed to better show the how the traction element is arranged with respect to the belt plates.
Figure 7B:
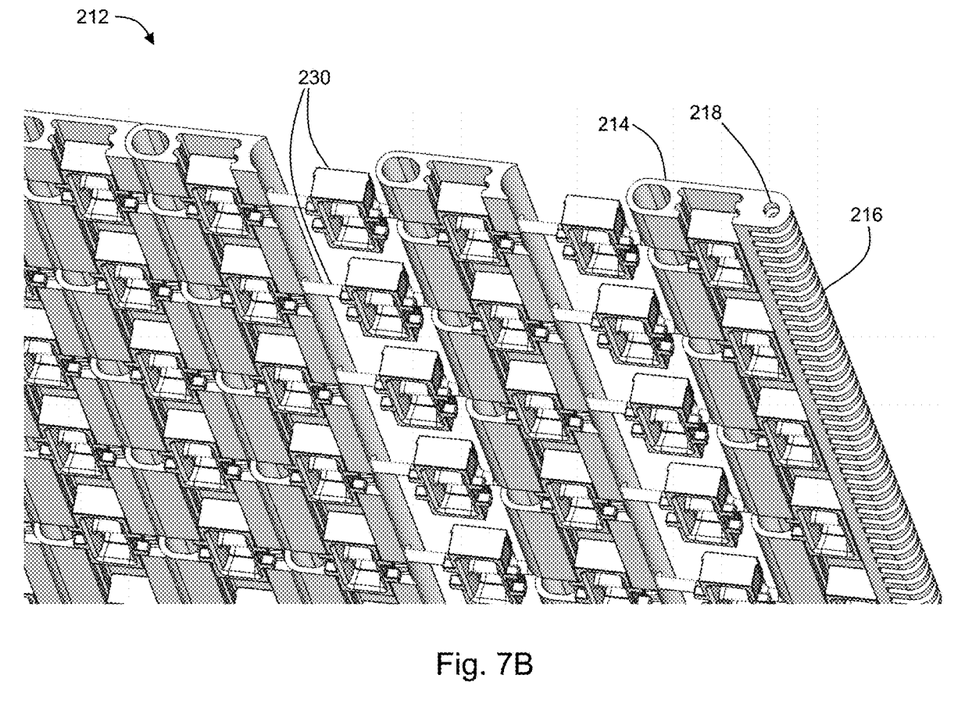
FIG. 7B is another perspective view of the belt section shown in FIG. 7A.

In some embodiments, such as that depicted in FIGS. 7A, 7B, and 8, a belt section 212 may comprise more than one traction element 230. The traction elements 230 of a belt section 212 may be aligned—i.e., each starting and ending at the same longitudinal locations of the belt section 212. In other configurations, a belt section 212 may have a plurality of traction elements 230 wherein the traction elements are not aligned. In some embodiments, a belt section may include traction elements in a bricklaid fashion. The traction elements may overlap by one, two, three or more drive elements.

In some embodiments, the cords of a belt are electrically conductive and are configured to form a circuit for the transmission of electric power and/or signals (e.g., data). Electrical connection may be made at a sprocket in order to introduce power and/or signals. In another example, conductive strips can be used to make electrical contact with belt components. Such an embodiment may be used to ground the belt and may advantageously be used with the through holes to the top surface of the belt modules described above for grounding any electric build up (or preventing such build up) on the top surface of the belt.

Due to the toothed structure of a traditional belt module, previous modules have generally been fabricated by molding processes. As a result most previous belt modules are limited to a maximum (module) length of 800 mm (where module length corresponds to belt width). If a wider belt is desired for a particular application, multiple belt modules must be bricklaid to build up the desired width of the belt. On the other hand, due to the more consistent cross-section of the belt plates of the present disclosure, embodiments of the belt plates may be extruded to any length needed—i.e., extruded to the full width of the belt. This eliminates the need to bricklay belt plates in order to build up a belt width. As a result, belts plates may be less expensive to manufacture, and the resulting belts may have reduced noise, friction, and wear caused by adjacent belt modules contacting each other. This may also result in faster assembly times since only one belt plate is necessary at each location along the length of a belt or belt section. Additional features of a belt plate profile may be machined using milling operations or otherwise.

In an aspect of the disclosure, a belt section for a modular belt is provided. For example, the belt section may have a predetermined length such that an endless belt can be made by assembling such belt sections. In some embodiments, the predetermined lengths of the belt sections are selected such that each belt section has a predetermined weight. For example, the lengths may be selected such that each belt section weighs no more than 20 kg.

The use of longitudinal traction elements allows the main forces of a conveyor belt to be taken up by the cord of the traction element. In traditional modular belts, each belt module transmits the forces (e.g., tensile forces) of the belt. The strength of traditional belt modules may be limited due to the molding processes required to fabricate such modules because the plastic component tends to have a weakness at melt joints which are found in the molded parts. For this reason, some traditional modular belts incorporate reinforcements such as, reinforcing lugs (e.g., steel lugs) in combination with reinforcing rods. However, the use of such reinforcements greatly increases the weight of the belt. Additionally, wear can be quite high in such belts because the use of metals may create frictions.

Figure 13A:
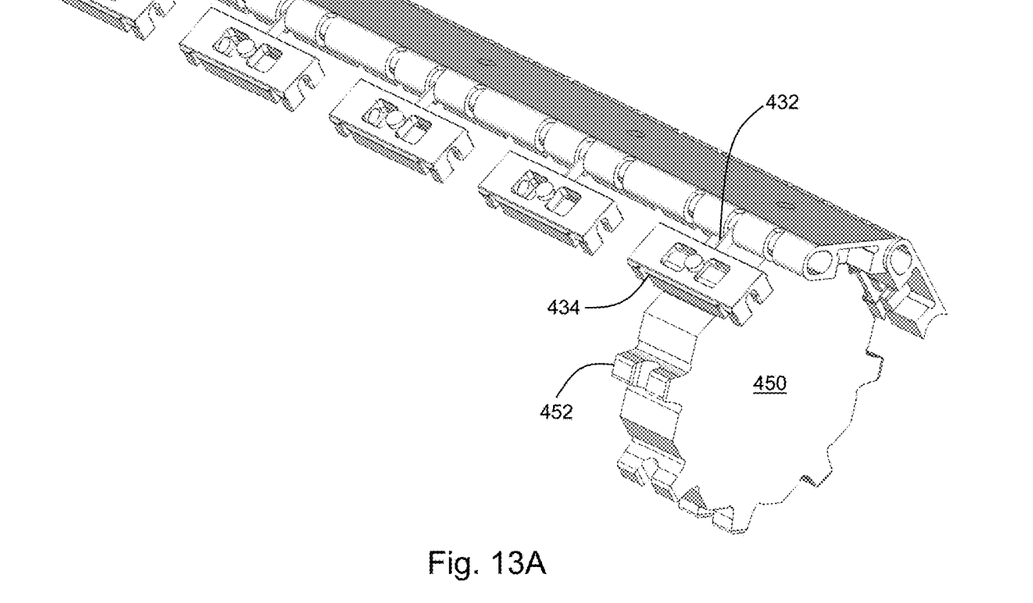
FIG. 13A is a diagrammatical view of a portion of a belt section according to an embodiment of the present disclosure engaging with a sprocket, wherein a belt plate has been removed to better show the interaction between sprocket and traction element.
Figure 13B:
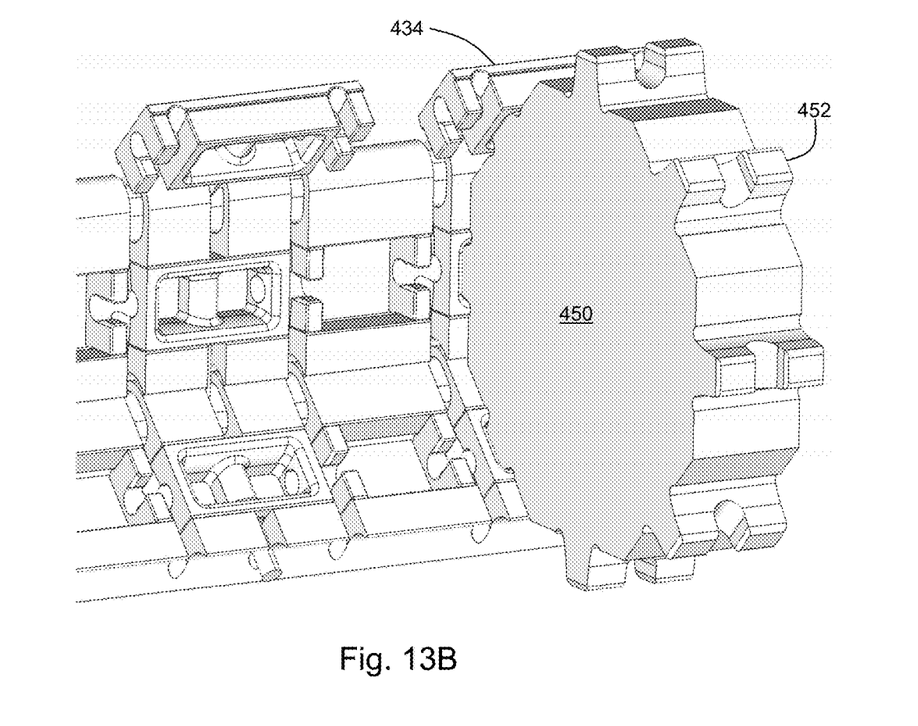
FIG. 13B is another view of the belt and sprocket of FIG. 13A.

In some embodiments, each drive element is configured to engage with a tooth of a sprocket. The sprocket may be, for example, a drive sprocket or an idler sprocket. FIGS. 13A and 13B depict portions of an exemplary embodiment, wherein teeth 452 of a sprocket 450 are configured to engage with drive elements 434 having a single cord 432 centered through the drive elements 434. Through engagement with a drive sprocket, the belt may be moved by force applied by the drive sprocket teeth to the drive elements. The force applied by a sprocket tooth to a drive element can be transferred directly into a tensile force through the cord of the traction element thereby moving the belt section. In this way, the belt plates are not subjected to the forces required to move the belt.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A modular belt, comprising:
   two or more longitudinal belt sections, each belt section comprising:
   a traction element having a cord and a plurality of drive elements attached to the cord and spaced apart along a length of the cord; and
   a plurality of belt plates, each belt plate being removably attached to a corresponding drive element; and
   two or more connectors, each connector configured to longitudinally couple two belt sections to form an endless belt.

2. The conveyor belt of claim 1, wherein each traction element further comprises at least one additional cord to which each drive element is attached.

3. The conveyor belt of claim 1, wherein each belt section further comprises at least one additional traction element to which each belt plate is attached.

4. The conveyor belt of claim 1, wherein each connector is a traction element.

5. The conveyor belt of claim 1, wherein each connector is a rod configured to connect an end drive element of a belt section to an end drive element of an adjacent belt section.

6. The conveyor belt of claim 1, wherein each belt section further comprises an end belt plate having a plurality of link ends extending in a direction of belt travel and configured to interdigitate with link ends of an adjacent belt section, and wherein a transverse opening is disposed through the plurality of link ends to accept a pivot rod.

7. The conveyor belt of claim 1, wherein the belt plates are produced by an extrusion process.

8. The conveyor belt of claim 1, wherein each belt plate includes a channel from a first end of the belt plate to a second end of the belt plate.

9. The conveyor belt of claim 8, wherein the drive elements are configured to attach to the channels of the belt plates.

10. The conveyor belt of claim 1, wherein the drive elements are configured to attach to the belt plates by a snap or clip connection.

11. The conveyor belt of claim 1, wherein each drive element further includes a protrusion configured to engage with a recess of the belt plate.

12. The conveyor belt of claim 11, wherein the recess is a through hole to a top surface of the belt plate.

13. The conveyor belt of claim 12, wherein one or more drive elements of the plurality of drive elements is electrically conductive and the protrusion of the conductive drive elements is configured to extend to the top surface of the corresponding belt plate.

14. The conveyor belt of claim 1, wherein each drive element is overmolded on the corresponding cord.

15. The conveyor belt of claim 14, wherein each cord has a diameter of between 1 mm and 10 mm.

16. The conveyor of claim 1, wherein the conveyor belt has a longitudinal stiffness defined by the cord.

17. The conveyor belt of claim 1, wherein the cord has a stiffness greater than 1000 daN/mm$^2$.

18. The conveyor belt of claim 1, wherein each cord is a rope or a cable.

19. The conveyor belt of claim 1, wherein each cord is made from plastic or metal.

20. The conveyor belt of claim 1, wherein each traction element is made from a composite material.

21. The conveyor belt of claim 1, wherein each drive element is configured to engage with a tooth of a sprocket.

* * * * *